(12) United States Patent
Sorin

(10) Patent No.: US 12,674,717 B2
(45) Date of Patent:     Jul. 7, 2026

(54) METHOD FOR DETECTING A LEAK IN A FLUID GUIDING ELEMENT OF A HEAT EXCHANGING DEVICE

(71) Applicant: Visionerf, Nuaille (FR)

(72) Inventor: Jean-Michel Sorin, Nuaille (FR)

(73) Assignee: Visionerf, Nuaille (FR)

( * ) Notice: Subject to any disclaimer, the term of this patent is extended or adjusted under 35 U.S.C. 154(b) by 248 days.

(21) Appl. No.: 18/562,790

(22) PCT Filed: Jun. 10, 2022

(86) PCT No.: PCT/EP2022/065804
§ 371 (c)(1),
(2) Date: Nov. 20, 2023

(87) PCT Pub. No.: WO2022/258799
PCT Pub. Date: Dec. 15, 2022

(65) Prior Publication Data
US 2024/0230453 A1     Jul. 11, 2024

(30) Foreign Application Priority Data
Jun. 11, 2021    (DE) .......................... 102021115111.2

(51) Int. Cl.
*G01M 3/22*          (2006.01)
(52) U.S. Cl.
CPC .................................... *G01M 3/222* (2013.01)
(58) Field of Classification Search
None
See application file for complete search history.

(56) References Cited

U.S. PATENT DOCUMENTS

| | | | |
|---|---|---|---|
| 4,945,305 A | 7/1990 | Blood | |
| 2003/0159495 A1* | 8/2003 | Cardinale ................ | G01N 1/24 |
| | | | 73/23.2 |

(Continued)

FOREIGN PATENT DOCUMENTS

| | | |
|---|---|---|
| CN | 111022936 A | 4/2020 |
| DE | 69628956 T2 | 5/2004 |

(Continued)

OTHER PUBLICATIONS

Chan, T.O.; Xia, L.; Lichti, D.D.; Sun, Y.; Wang, J.; Jiang, T.; Li, Q. Geometric Modelling for 3D Point Clouds of Elbow Joints in Piping Systems. Sensors 2020, 20, 4594. (Year: 2020).*

(Continued)

*Primary Examiner* — Mark A Shabman
(74) *Attorney, Agent, or Firm* — Kirton McConkie; Whitney Blair

(57)          ABSTRACT

Method for detecting a leak in a fluid guiding element 16, 18 of a heat exchanging device 12, comprising the following steps:
   a) Acquiring a cloud of points 44 of the heat exchanging device 12 in a three-dimensional virtual space 48 using a 3D sensor 34, each of said points representing a surface point 46*a* on the outer surface of the heat exchanging device 12,
   b) Searching within the cloud of points 44 for structures 50 corresponding to tubes having a predefined outer diameter,
   c) Searching the obtained structures 50 for an area of interest 52 where the diameter or the direction of the tube changes,
   d) Once an area of interest 52 is found, determining an approach path 58 for approaching a sniffing probe 22 of a gas leak detector 24 to the area of interest 52 within the cloud of points 44, and (Continued)

Figure 1:
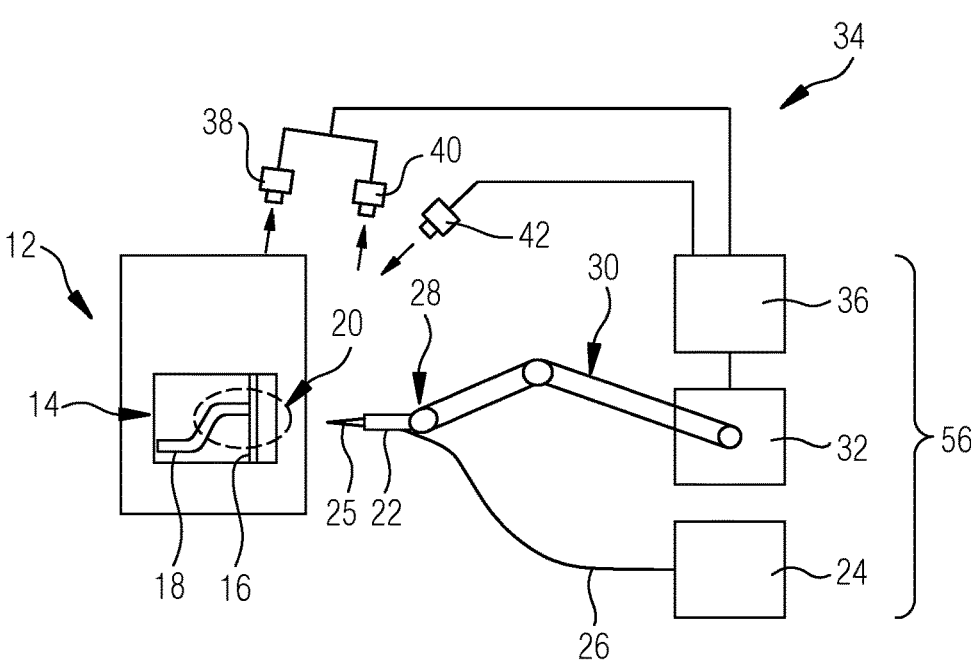

e) Physically approaching the sniffing probe 22 to a testing area 20 of the heat exchanging device 12 automatically along the approach path 58, where the testing area 20 corresponds to the area of interest 52 within the cloud of points 44.

19 Claims, 2 Drawing Sheets

(56) References Cited

U.S. PATENT DOCUMENTS

| | | | |
|---|---|---|---|
| 2007/0214870 A1* | 9/2007 | Morse | B01D 46/121 96/417 |
| 2016/0363436 A1 | 12/2016 | Clark et al. | |
| 2019/0339158 A1* | 11/2019 | Yanai | G01M 3/002 |
| 2020/0005020 A1* | 1/2020 | Meany | G06F 16/284 |

FOREIGN PATENT DOCUMENTS

| | | |
|---|---|---|
| DE | 69733014 T2 | 2/2006 |
| DE | 102005022157 A1 | 11/2006 |
| JP | 2013117459 A | 6/2013 |
| WO | 2003008923 A | 1/2003 |
| WO | 2006069877 A | 7/2006 |
| WO | 2009016160 A1 | 2/2009 |

OTHER PUBLICATIONS

PhoXi 3D Scanner S datasheet. Retrieved from https://cdn.graftek.com/wp-content/uploads/2022/05/05212828/PhoXi3DScannerS_Datasheet-04_2021.pdf on Dec. 4, 2025 (Year: 2021).*

Daikin, Pilsen, Automated Inspection of Heat Exchangers, website article, Mar. 29, 2021, Photoneo, http://web.archive.org/web/20210419153428/https://www.photoneo.com/case-study/automated-inspection-of-heat-exchangers/.

\* cited by examiner

METHOD FOR DETECTING A LEAK IN A FLUID GUIDING ELEMENT OF A HEAT EXCHANGING DEVICE

This application is a National Stage of International Application No. PCT/EP2022/065804, filed Jun. 10, 2022, and entitled METHOD FOR DETECTING A LEAK IN A FLUID GUIDING ELEMENT OF A HEAT EXCHANGING DEVICE, which claims priority to German Patent Application No. DE 10 2021 115 111.2, filed Jun. 11, 2021, which are each incorporated herein by reference in their entirety.

The invention relates to a leak detector for detection of leaks on a test object.

A leak detector is described e.g. in DE 10 2005 022 157 A1 (Inficon). This leak detector comprises a probe whose probe tip will be placed against predetermined test regions of a test object. The test object is filled with a test gas, e.g. helium. Via said probe tip, test gas that is leaking out will be sucked by a basic unit and will be supplied to a test gas detector which can be designed e.g. as a mass spectrometer.

When use is made of leak detectors, the test object, e.g. an air conditioning system or the cooling aggregate of a refrigerator, will be filled with a test gas, and with a sniffing probe, it can be detected whether test gas is leaking out of the test object. In quality inspection of products in industry, the probe tip is applied to specific testing areas of the test object where a possibility of leakage exists. In doing so, one will move the probe manually to the testing areas. In this process, it is difficult to verify whether the probe tip has been moved to all relevant testing areas of the test objects. An operating person might inadvertently omit certain testing areas or skip other testing areas which he considers to be uncritical in his subjective assessment.

U.S. Pat. No. 4,945,305 (Ascension) describes a position determining system comprising a transmitter for generating a pulsed DC magnetic field, and a receiver arranged on the object. This method is particularly suited for determination of an instantaneous position, comparison thereof to a desired position and feedback. No disturbance will be caused by non-magnetic objects in the line of sight between the transmitter and the receiver. Residual disturbance by large masses of magnetizable metal such as e.g. a compressor block and a refrigerating machine, can be eliminated by calibration because the to-be-checked arrangement is static. This method has been found to be particularly useful for the realization of the disclosure.

WO 2009/016160 A1 discloses a leak detector comprising a basic unit that is connected to a probe by a hose. The probe tip is placed against test zones or testing areas of the test object. In case that test gas escapes from the test object, this is detected by a test gas detector in the base unit. A position determining system is provided which comprises a transmitter, a receiver that is disposed inside the probe, and a supply and evaluation unit. Thereby, the presence of the probe tip in the individual testing areas is monitored and confirmed.

In the field of automation, it is known to capture digital data of physical objects using a 3D Sensor, to thereby acquire a cloud of points in a 3-dimensional virtual space, where said points each represent a surface point on the outer surface of the physical object. Robots used in the automation industry, such as in automated manufacturing of products, such as cars, are controlled by software algorithms employing the captured digital data. This is usually employed in order to sense the outer circumference or surfaces of the entire physical object, in order to locate, grasp, move or relocate the object, or to paint the outer surface of the object with a paint spraying robotic arm, for example in the vehicle manufacturing industry.

Sniffing leak detection on heat exchanging devices, such as refrigerators, air conditioning units, heat pumps, etc. is a part of the quality inspection of heat exchanging devices. A human operator needs to visually identify the relevant testing areas on the heat exchanger, such as liquid guiding tubes, and to move the probe manually to the testing areas one after the other. This way of sniffing leak detection on heat exchanging devices is time consuming and susceptible to errors caused by the human factor, such as omitting testing areas or not sufficiently approaching the sniffing probe to a testing area.

It is an object of the invention to provide a more reliable and faster detection of a leak in a fluid guiding element of a heat exchanging device.

The method of the invention is defined by the features of independent claim 1.

Accordingly,

- a) a cloud of points in a 3-dimensional virtual space is acquired from the heat exchanging device by use of a 3D sensor, each of said points representing a surface point on an outer surface of the heat exchanging device.
- b) After acquiring the cloud of points, the cloud of points is searched for structures corresponding to tubes having a predefined outer diameter. Such tubes may correspond to fluid guiding elements of the heat exchanging device, which need to be searched for leaks.
- c) The structures obtained according to b) are searched for at least one area of interest where the diameter or the direction of the tube changes or where a tube ends, such as by an increase in diameter corresponding to a welding or soldering point or welding or soldering location, to a joint or junction with a further tube, to a connection area where the tube is connected to another tube, such as by welding or soldering, or to an end of a tube. A change of direction of the tube could be a bend of the tube, where the direction of the main longitudinal axis (center axis) of the tube changes. A change of direction of the tube might also be a bend in an outer wall of the tube. These areas of interest represent weak points of the searched fluid guiding elements, and are therefore of particular relevance for sniffing leak detection during quality inspection in an automated manufacturing process of a heat exchanging device.
- d) Once an area of interest is found, the method of the invention determines an approach path for approaching a sniffing probe of a gas leak detector of a gas leak detection system to the area of interest within the cloud of points. This might typically be performed by calculating several approach paths within the cloud of points in the virtual space, before actually approaching the physical sniffing probe to the heat exchanging device.
- e) Once an approach path has been determined, the sniffing probe is physically approached manually to a testing area of the heat exchanging device along the approach path. The testing area on the physical heat exchanging device corresponds to the previously obtained area of interest within the cloud of points.

In other words, the invention provides for acquiring a virtual model or simulation of at least a part of the heat exchanging device using a 3D sensor, where the virtual model or simulation is searched for possible leakage zones (testing areas on the physical heat exchanging device) which correspond to respective areas of interest of the virtual model. Before actually physically approaching the sniffing probe to such testing area, the invention provides for determining an applicable approach path using the virtual model, rather than the physical heat exchanging device, in order to physically approach the sniffing probe to a testing area only once an approach path to the respective area of interest of the virtual model has been found.

The invention thereby provides for a more reliable automated and faster sniffing leak detection of fluid guiding elements of heat exchanging devices. The fluid guiding elements are often small and hidden within or below the outer circumference of the heat exchanging device. In particular, different types of heat exchanging devices typically have different locations of their fluid guiding structures that are to be tested. The invention therefore also enables to automatically search different types of heat exchanging devices in a reliable and fast manner.

Preferably, a method is carried out automatically by a leak detection system comprising the gas leak detector and, preferably, a robot.

Said cloud of points in the 3-dimensional virtual space is preferably generated from image data obtained by an optical camera, preferably from at least two optical cameras of an imaging system. The 3D sensor may be an imaging system with at least one optical camera and at least one illumination device, such as an LED or laser source.

Subsequent to step a), the cloud of points maybe compared with digital reference data of the structures of the heat exchanging device to be searched within the cloud of points. This may be employed in order to identify and/or localize said structures, such as a frame or other component of the heat exchanging device, as, for example, a compressor. Said digital reference data is preferable previously obtained CAD data of the heat exchanging device. The digital reference data may be stored within a memory of the leak detection system of the invention.

According to an embodiment, at least one search area within the cloud of points may be selected or obtained based on the comparison of the cloud of points with the digital reference data. The search area may be obtained using position data of the position of the heat exchanging device within the cloud of points, which position data may be obtained through step b). For example, once the structures corresponding to a tube having a predefined outer diameter have been obtained through step b), the position of such structures may be acquired and stored. This position data may be used to select the search area in which the obtained structures or tubes are searched for changes in diameter, in order to thereby obtain the area of interest, in which the leak detection shall be carried out.

Said reference data may be generated by said 3D sensor of the leak detection system from the same heat exchanging device or from a corresponding device of the same type.

Step c) may be carried out by following and analyzing those points within the cloud of points which correspond to the tube found according to step b).

According to step d), an ideal position of the sniffing probe for gas leak detection of the tube or testing area may be calculated.

Step d) may comprise determining whether a determined approach path results in a collision of the sniffing probe with structures of the heat exchanging device, and step d) comprises determining a further approach path, if a collision is expected for a previously determined approach path.

Step d) may be repeated until an approach path is determined for which no collision of the sniffing probe with structures of the heat exchanging device is expected. Step d) may additionally or alternatively comprise using previously obtained and stored digital data, such as CAD data, of the sniffing probe and/or of a robot carrying out step e). In particular, at least step e) may be carried out by a robot which can be part of the leak detection system.

At least one of steps a)-d) may be carried out by a software algorithm of a leak detection system comprising a leak detector, and, preferably, the above-mentioned robot.

Step d) may comprise generating a trajectory within or through the cloud of points in the virtual space, said trajectory to being followed by a robot carrying the sniffing probe when performing the actual leak detection.

At least steps b)-d) may be repeated for several regions of interest, and step e) may be subsequently carried out a respective number of times to subsequently approach the sniffing probe to respective testing areas corresponding to said areas of interest.

Subsequent to step e), said method of the invention may perform step f), according to which the testing region is sniffed with the sniffing probe to perform leak detection on said tube within the testing area for identifying a possible leak of said fluid guiding structure.

Said sniffing probe may comprise a generally U-shaped sniffer tip with two distally extending sniffing arms, where at least one of the sniffing arms comprises an inlet opening. Such U-shaped sniffer tip is to be approached to the testing area such that the two sniffer tip arms are positioned on opposing sides of the tube to be tested.

Said sniffing probe or a sniffing tip of said sniffing probe may be automatically reconfigured, transformed or exchanged to another sniffing probe or sniffing tip, once step d) determines that an approach path results in a collision of the sniffing probe with structure of the heat exchanging device.

The method of the invention may adapt to a new type of heat exchanging device by being provided with information about the location of at least one area of interest and/or about the location of where the diameter or the direction of at least one (further) tube changes, about the direction to be searched within an area of interest and/or about the predefined outer diameter to be searched for in step b).

Figure 2:
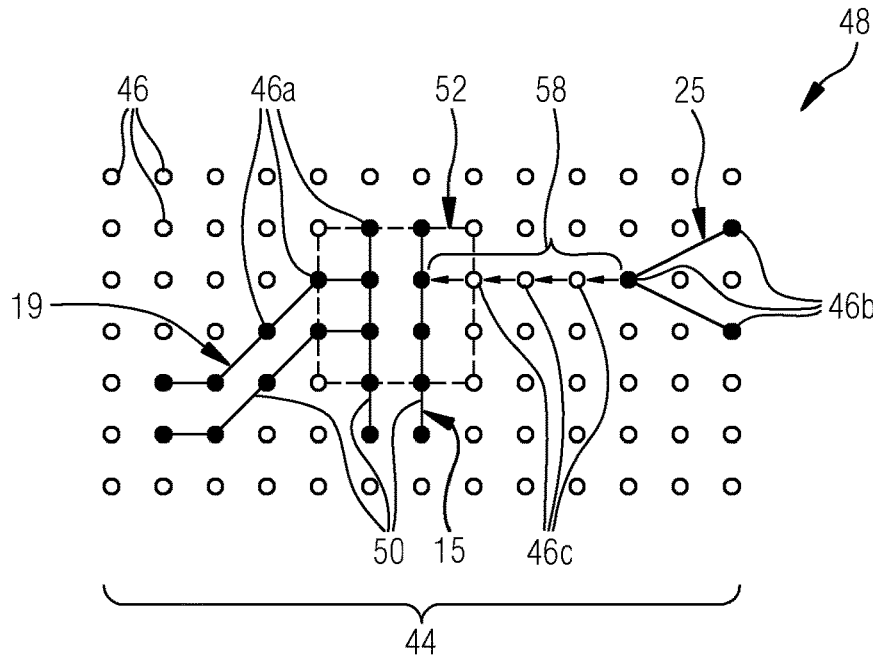
Figure 3:
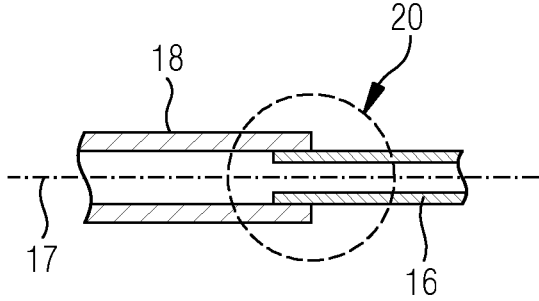
Figure 4:
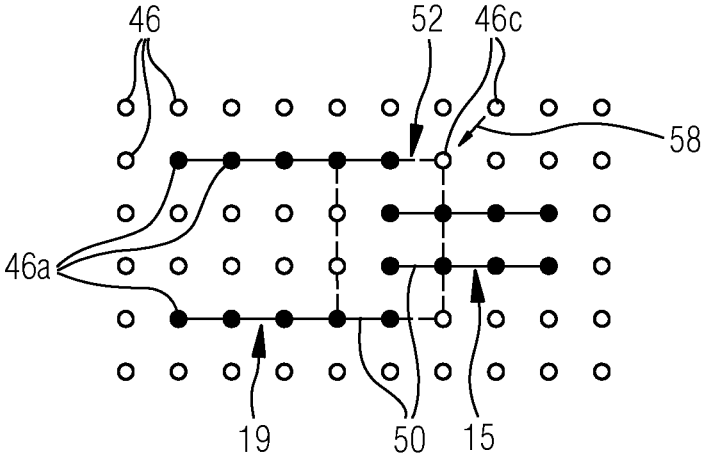

In the following, embodiments of the invention are described in more detail with references to the drawings, in which FIG. 1 shows a schematic representation of a leak detection system and a heat exchanging device, FIG. 2 shows a schematic representation of the cloud of points in virtual space acquired from the heat exchanging device according to FIG. 1, FIG. 3 shows a schematic representation of a detail of a further heat exchanging device, and FIG. 4 shows a schematic representation of the cloud of points in virtual space acquired from the heat exchanging device according to FIG. 3.

FIG. 1 shows a heat exchanging device 12 in the form of a refrigerator. The expression "heat exchanging device" as used in the present disclosure relates to systems or devices which comprise a heat exchanger, such as refrigerators, air conditioning systems, heat pumps, etc. The heat exchanging device comprises on its lower rear side 14 several fluid guiding elements 16, 18 in the form of tubes, which are welded on the rear side of the refrigerator during its manufacturing process. As part of a fully automated quality control, particular testing areas 20 need to be identified, in order to perform leak detection in the testing areas 20. A testing area 20 is considered to be an area of the heat exchanging device, where tubes are mounted or welded or soldered together, where a tube ends, where a tube is connected to another tube, or where tubes join or intersect with each other. In the embodiment shown in FIG. 1, a first fluid guiding element 16 is arranged vertically and a second fluid guiding element 18 is connected with one of its ends to the first fluid guiding element 16. The area where the tubes 16, 18 are connected, is considered a testing area 20, and shown in FIG. 1 by a dashed circle.

An even more typical example is shown in FIGS. 3 and 4, where two tubes 16, 18 of a different diameter are connected with each other along a common longitudinal axis 17.

The aim of the invention is to automatically move a sniffing probe 22 of a sniffing leak detector 24 to the testing area 20, such that the sniffing tip 25 of the sniffing probe 22 is positioned close enough to draw in gas escaping from a possible leak in one of the pipes 16, 18 within the testing area 20. The sniffing probe 22 is connected to the gas leak detector 24 via a connection hose 26 in a conventional manner.

The sniffing probe 22 is mounted to the distal end 28 of a robotic arm 30 of a robot 32.

A 3D sensor 34 in the form of an imaging system 36 which comprises two optical cameras 38, 40 and an illumination device 42 in the form of a LED lamp, captures digital image data from the lower rear side 14 of the heat exchanging device 12. In a generally known manner, the illumination device 42 illuminates the heat exchanging device 12, and, in particular, the lower rear side 14 of the heat exchanging device 12. The cameras 38, 40 capture the reflected light, and the imaging system 36 generates digital image data from which a cloud 44 of points 46 in a 3-dimensional virtual space 48 is acquired.

FIGS. 2 and 4 show simplified reduced graphical representations of the acquired cloud of points 44, which is depicted in a manner being reduced to a 2-dimensional matrix only for illustration purposes. In fact, the cloud of points 44 as acquired by the 3D sensor 34 is 3-dimensional, such as in the form of a 3-dimensional grid or mesh. In other words, each point 46 of the cloud of points 44 comprises three coordinates x, y, z, as well as an amplitude value representing, for example, the intensity of reflected illumination captured by the cameras 38, 40.

According to the invention, the cloud of points 44 is searched for structures corresponding to tubes having a predefined outer diameter. For example, the amplitude values of the points 46 may be searched for values within a specific range and within specific distances for the geometric structure of a tube having a predefined outer diameter, which corresponds to the diameter of the tubes 16, 18.

In FIGS. 2 and 4, the points of the cloud 44, which correspond to the tubes 16, 18, are provided with references signs 46a, and are represented by filled circles, whereas other points 46 are depicted as empty circles. Lines 50 connect the points 46a, and thereby visualize the structures or representations 15, 19 of the tubes 16, 18 of the heat exchanging device 12 in the virtual space 48.

The expression "virtual space" generally relates to a simulated environment of the heat exchanging device 12, the robot 32, the robotic arm 30 and the sniffing probe 22, and of the space between the probe 22 and the heat exchanging device 12

As a next step, the method of the invention searches the obtained structures or points 46a for changes in diameter. For example, if the points 46a or the lines 50 corresponding to the left horizontal tube 18 are followed from left to right in FIG. 2, the diameter of the structural representation 19 of the tube 18 within the virtual space 48 changes, when the structural representation 19 of the tube 18 meets with and connects to the structural representation 15 of the vertical tube 16. For example, this can be discovered by analyzing the distances between pairs of points 46a, and comparing the distances with the respective distances of further points 46a along the lines 50. The points 46a of the structural representation 15 of the vertical tube 16 appear to increase in diameter of the structural representation 19 of the tube 18, when analyzed from left to right.

Likewise, when analyzing the structural representation 15 of the vertical tube 16 from bottom to top, distances between pairs of points 46a increase in the area, where the structural representation 15 of the vertical tube 16 meets with the structural representation 19 of the horizontal tube 18, which appears to be an increase in diameter of the tube 16.

The area, where such an increase in diameter is discovered, is marked by the dashed line in FIGS. 2 and 4 as an area of interest 52. This area of interest 52 is stored in a memory of the leak detection system 56, which memory may be comprised within the robot 32 and/or within the 3D sensor 36, or, alternatively, within a separate computer device connected to the robot 32 and/or to the 3D sensor 36. The leak detection device 56 comprises the leak detector 24, the robot 32 and the 3D sensor 34.

The area of interest 52 in the virtual space 48 corresponds to the testing area 20 of the heat exchanging device 12, to which testing area 12 the sniffing probe 22 needs to be approached for leak detection.

As a next step, an approach path 58 for approaching the sniffing probe to the testing area 20, and for approaching a graphical representation of the sniffing probe 22 in the cloud of points 44 to the area of interest 52 is to be determined. This is achieved by employing CAD data of the sniffing probe 22 and its sniffing tip 25, and by comparing a cloud of points 44 with the CAD data. Thereby, the points 46b within the cloud of points 44 which correspond to the sniffing tip 25 or sniffing probe 22 may be identified. Thereafter, an approach path 58 is calculated for approaching the sniffing tip 25 to the testing area 20 or area of interest 52 within the virtual space 48. Thereby, an approach path 58 is to be determined, which avoids a collision of the sniffing tip 25, the sniffing probe 22 and/or the robotic arm 30 or the connection hose 26 with the heat exchanging device 12 or any structures or components thereof. This approach path 58 is depicted by the four arrows and by the points 46c in FIG. 2.

Only after an approach path 58 has been determined which does not result in a collision within the virtual space 48 or the simulated environment, the sniffing tip 25 is actually approached by the robot 32 and robotic arm 30 to the real testing area 20 in the real world.

Thereby, leak detection in the manufacturing industry and quality control can be performed fully automated, much faster and much more reliable, as compared to the conventional sniffing leak detection of heat exchanging devices performed by human operators.

The invention claimed is:
1. Method for detecting a leak in a fluid guiding element of a heat exchanging device, comprising the following steps:
   a) acquiring a cloud of points of the heat exchanging device in a three-dimensional virtual space using a 3D sensor, each of said points representing a surface point on the outer surface of the heat exchanging device,
   b) searching within the cloud of points for structures corresponding to tubes having a predefined outer diameter, c) searching the obtained structures for an area of interest where the diameter or the direction of the tube changes, d) once an area of interest is found, determining an approach path for approaching a sniffing probe of a gas leak detector to the area of interest within the cloud of points, determining whether a determined approach path results in a collision of the sniffing probe with structures of the heat exchanging device, and determining a further approach path, if a collision is expected for a previously determined approach path, wherein step d) is repeated until an approach path is determined for which no collision of the sniffing probe with structures of the heat exchanging device is expected, and e) physically approaching the sniffing probe to a testing area of the heat exchanging device automatically along the approach path, where the testing area corresponds to the area of interest within the cloud of points.

2. The method according to claim 1, wherein the method is carried out automatically by a leak detection system comprising the gas leak detector.

3. The method according to claim 1, wherein said cloud of points in the three-dimensional virtual space is generated from image data obtained from at least two optical cameras of an imaging system.

4. The method according to claim 1, wherein the 3D sensor is an imaging system with at least one optical camera and at least one illumination device.

5. The method according to claim 1, wherein subsequent to step a), the cloud of points is compared with digital reference data of the structures to be searched of the heat exchanging device within the cloud of points.

6. The method according to claim 5, wherein said digital reference data is previously obtained CAD data of the heat exchanging device.

7. The method according to claim 5, wherein at least one search area within the cloud of points is selected based on the comparison with the reference data.

8. The method according to claim 7, wherein the selecting of the search area is carried out using position data of the position of the heat exchanging device within the cloud of points obtained through step b).

9. The method according to claim 5, wherein said reference data is generated by said 3D sensor from the same heat exchanging device or from a corresponding heat exchanging device of the same type.

10. The method according to claim 1, wherein step c) is carried out by following and analyzing those points within the cloud of points which correspond to the structure found according to step b).

11. The method according to claim 1, wherein according to step d), an ideal position of the sniffing probe for gas leak detection of the tube or testing area is calculated.

12. The method according to claim 1, wherein step d) comprises using previously obtained and stored digital data of the sniffing probe and/or of a robot carrying out step e).

13. The method according to claim 1, wherein at least step e) is carried out by a robot.

14. The method according to claim 1, wherein at least one of steps a)-d) is carried out by a software algorithm of a leak detection system comprising a leak detector and a robot.

15. The method according to claim 1, wherein step d) comprises generating a trajectory to be followed by a robot carrying the sniffing probe.

16. The method according to claim 1, wherein at least steps b)-d) are repeated for several regions of interest, and wherein step e) is subsequently carried out a respective number of times to subsequently approach the sniffing probe to respective testing areas corresponding to said areas of interest.

17. The method according to claim 1, wherein subsequent to step e) said method performs f) sniffing the testing region with the sniffing probe to perform leak detection on said tube within the testing area for identifying a possible leak of said fluid guiding structure.

18. The method according to claim 1, wherein said sniffing probe comprises a generally U-shaped sniffer tip with two distally extending sniffing arms.

19. The method according to claim 1, wherein said sniffing probe or a sniffing tip of said sniffing probe is automatically reconfigured, transformed or exchanged to another sniffing probe or tip once step d) determines that an approach path results in a collision of the sniffing probe with structures of the heat exchanging device.

* * * * *